(12) United States Patent
Brewer et al.

(10) Patent No.: US 8,655,905 B2
(45) Date of Patent: *Feb. 18, 2014

(54) INCREMENTAL QUERY REFINEMENT

(75) Inventors: Brett D. Brewer, Sammamish, WA (US); Oliver Hurst-Hiller, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/368,948

(22) Filed: Feb. 8, 2012

(65) Prior Publication Data

US 2012/0136886 A1 May 31, 2012

Related U.S. Application Data

(63) Continuation of application No. 12/972,431, filed on Dec. 18, 2010, now Pat. No. 8,135,729, which is a continuation of application No. 10/749,936, filed on Dec. 30, 2003, now Pat. No. 7,890,526.

(51) Int. Cl.
*G06F 7/00* (2006.01)
*G06F 17/30* (2006.01)

(52) U.S. Cl.
USPC ........... 707/767; 707/765; 707/766; 707/758; 707/759; 709/201

(58) Field of Classification Search
None
See application file for complete search history.

(56) References Cited

U.S. PATENT DOCUMENTS

| | | | |
|---|---|---|---|
| 6,006,225 A * | 12/1999 | Bowman et al. ............ | 1/1 |
| 6,401,084 B1 * | 6/2002 | Ortega et al. ............ | 707/706 |
| 6,411,952 B1 | 6/2002 | Bharat et al. ............ | 1/1 |
| 6,434,547 B1 | 8/2002 | Mishelevich et al. ............ | 1/1 |
| 6,453,312 B1 * | 9/2002 | Goiffon et al. ............ | 1/1 |
| 6,526,440 B1 | 2/2003 | Bharat | |
| 6,529,903 B2 | 3/2003 | Smith et al. | |
| 6,564,213 B1 * | 5/2003 | Ortega et al. ............ | 1/1 |
| 6,615,209 B1 | 9/2003 | Gomes et al. | |
| 6,658,423 B1 | 12/2003 | Pugh et al. | |
| 6,678,681 B1 | 1/2004 | Brin | |
| 6,701,309 B1 | 3/2004 | Beeferman et al. ............ | 1/1 |
| 6,714,214 B1 | 3/2004 | DeMello et al. ............ | 715/711 |
| 6,772,150 B1 * | 8/2004 | Whitman et al. ............ | 707/721 |
| 6,941,297 B2 * | 9/2005 | Carmel et al. ............ | 707/765 |
| 6,947,930 B2 * | 9/2005 | Anick et al. ............ | 1/1 |

(Continued)

OTHER PUBLICATIONS

S. Brin and L. Page. *The Anatomy of a Large-Scale Hypertextual Web Search Engine.* Aug. 7, 2000.

(Continued)

*Primary Examiner* — Robert Beausoliel, Jr.
*Assistant Examiner* — Susan F Rayyan
(74) *Attorney, Agent, or Firm* — Dave Ream; Jim Ross; Micky Minhas (57) ABSTRACT

A method of incrementally refining queries and updating query result lists without requiring a user to provide an explicit indicator of query submission. In the method, one or more query related character patterns are defined. Entry of query defining characters by a user is monitored to detect entry of a defined query related character pattern. The user is provided with one or more suggested query refinement options and an updated query result list each time a defined query related character pattern is detected. The query related character patterns may be a character pattern that indicates a word has been input by the user.

20 Claims, 9 Drawing Sheets

(56) References Cited

U.S. PATENT DOCUMENTS

| | | | |
|---|---|---|---|
| 6,981,040 B1* | 12/2005 | Konig et al. | 709/224 |
| 7,069,254 B2 | 6/2006 | Foulger et al. | 706/14 |
| 7,096,218 B2* | 8/2006 | Schirmer et al. | 707/767 |
| 7,181,497 B1 | 2/2007 | Appelman et al. | 709/206 |
| 7,185,271 B2 | 2/2007 | Lee et al. | 715/226 |
| 7,254,569 B2 | 8/2007 | Goodman et al. | 1/1 |
| 7,321,892 B2 | 1/2008 | Vadon et al. | 707/767 |
| 7,752,326 B2* | 7/2010 | Smit | 709/231 |
| 7,836,044 B2* | 11/2010 | Kamvar et al. | 707/713 |
| 8,086,619 B2* | 12/2011 | Haahr et al. | 707/765 |
| 2001/0053968 A1 | 12/2001 | Galitsky | |
| 2002/0052894 A1* | 5/2002 | Bourdoncle et al. | 707/513 |
| 2002/0103644 A1 | 8/2002 | Brocious et al. | 704/246 |
| 2002/0123988 A1 | 9/2002 | Dean et al. | |
| 2002/0133481 A1 | 9/2002 | Smith et al. | |
| 2002/0156917 A1 | 10/2002 | Nye | 709/238 |
| 2002/0165856 A1 | 11/2002 | Gilfillan et al. | 707/3 |
| 2003/0182463 A1 | 9/2003 | Valk | 709/310 |
| 2003/0225756 A1 | 12/2003 | Liu | 707/3 |
| 2003/0225787 A1 | 12/2003 | Liu et al. | 707/104.1 |
| 2004/0064447 A1* | 4/2004 | Simske et al. | 707/5 |
| 2004/0083213 A1* | 4/2004 | Wu et al. | 707/4 |
| 2004/0143564 A1* | 7/2004 | Gross et al. | 707/1 |
| 2005/0283468 A1* | 12/2005 | Kamvar et al. | 707/3 |
| 2006/0112178 A1 | 5/2006 | Van Vleet et al. | 709/224 |
| 2006/0129915 A1 | 6/2006 | Chan | 715/512 |
| 2007/0106492 A1 | 5/2007 | Kim | 704/9 |

OTHER PUBLICATIONS

I. Cruz and K. James. *A User-Centered Interface for Querying Distributed Multimedia Databases*. Worcester Polytechnic Institute Department of Computer Science. Exact date unknown, but prior to Dec. 30, 2003.

V. Raman and J. Hellerstein. *Partial Results for Online Query Processing*. ACM SIGMOND Jun. 4-6, 2002. pp. 275-286.

L. Finkelstein, E. Gabrilovich, Y. Matias, E. Rivlin, Z. Solan, G. Wolfman and E. Ruppin. *Placing Search in Context: The Concept Revisited*. Tenth International World Wide Web Conference, May 2001.

J. Cooper and R. Byrd. *Lexical Navigation: Visually Prompted Query Expansion and Refinement*. ACM, Inc. 1997, Jul. 25-28, 1997.

B. Shneiderrnan and D. Byrd. *Sorting out Searching a User-Interface Framework for Text Searches*. CACM 41, 4 (Apr. 1998), pp. 95-98.

*Adding a New Dimension to Search: The Teoma Difference in Authority*. Ask Jeeves, Inc. Dec. 19, 2003.

G. Notess. *Review of Teoma*. Greg R. Notess. Dec. 19, 2003.

M. Hines. *AOL expands Google search pact*. CNET Networks, Inc. Oct. 29, 2003.

* cited by examiner

INCREMENTAL QUERY REFINEMENT

RELATED APPLICATIONS

This Application is a continuation of and claims priority from U.S. patent application Ser. No. 12/972,431, filed Dec. 18, 2010, which is a continuation of U.S. patent application Ser. No. 10/749,936, filed Dec. 30, 2003, which are both incorporated by reference herein in their entirety.

BACKGROUND

Keyword based search engines are in widespread use today for information retrieval, such as Web-based information retrieval. Users typically enter queries through a search toolbar. One problem with keyword based search engines and searching on the Web is that it is very common for many irrelevant results to be returned to the user. One reason for this is that the majority of existing search engines utilize a simple "bag of words" approach to search where the user submits one or more query terms and the search engine returns ranked results based on these query terms alone. Better query input by the user results in better ranked results.

Typical existing search engines do not provide a list of query results until the entire query is entered by the user and submitted. As a result, the user has no idea whether their query will provide relevant results until the entire query is entered by the user. Users of typical existing search engines constantly repeat the following cycle: "enter entire query, review results, refine entire query, resubmit entire query." User time is wasted between these steps, because query results are not available to the user until an entire query is entered and suggested query refinements are not presented to the user. This wasted time degrades the user experience.

Existing systems commonly provide query refinement or query expansion suggestions alongside a traditional ranked list of search results. However, these refinement or expansion suggestions and the ranked list of search results are not provided until after the query has been submitted by the user. For example, a popular topics suggestion may be provided above the search results after the user submits the query. As another example, GOOGLE™ provides "did you mean" suggestions above the search results after the user submits a query.

Many existing search systems with text entry boxes perform some auto-complete function. In UNIX™ and DOS, the command line includes an auto-complete feature. An auto-complete function is included in the INTERNET EXPLORER™ address bar and the OUTLOOK™ address fields. These existing systems typically draw their suggestions only from strings entered by the user in the past or from known entities in the system, such as application, file, or directory names.

SUMMARY

The present disclosure concerns a method of incrementally refining queries and updating query results without requiring a user to provide an explicit indicator of query submission. In the method, one or more query related character patterns are defined that do not include an explicit indicator of query submission. Entry of query defining characters by a user is monitored to detect entry of a defined query related character pattern. The user is provided with one or more suggested query refinement options and updated query results each time a defined query related character pattern is detected.

In one embodiment, the query related character patterns are character patterns that indicate a word has been input by the user. One such query related character pattern is a string of characters followed by a space. Another query related character pattern is entry of a string of characters followed by a predetermined time delay before additional characters are entered. In this embodiment, the user may be provided with one or more query refinement options, such as word or phrase auto-complete options and/or spelling correction options, as the user enters query defining characters. When entry of a query defining word by the user is detected, the user is provided with updated query results In one embodiment, the query refinement options and/or the result updating is personalized for each user. This may be accomplished by tracking queries entered one or more users and/or the results selected by the user and adjusting the suggested query refinement options and the order of the result lists based on the tracked history of queries previously entered by one or more users and/or results previously selected by one or more users.

In one embodiment, a visual indicator is provided to the user when an updated query result list is provided. For example, the color or font of the result list could change, the query result list could be animated for a predetermined period of time, and/or an icon could appear to indicate that the results have been updated. In one embodiment, the updated query results include result listings from a user hard drive, an intranet server, and an internet server.

The defining of the query related character patterns may be controlled to control the frequency at which the query results and the query refinement options are updated. In one embodiment, and the query related character patterns are based on characteristics of a client-server connection. One characteristic of the client-server connection is connection speed. The query related character patterns may be defined such that query refinement option updates and result updates occur more frequently with higher connection speeds. In one embodiment, a user input is provided that allows the user to adjust the query related character patterns and/or the frequency at which the results and the query refinement options are updated. In one embodiment, the frequency at which the results and the refinement options are updated is tuned for a given user by monitoring how the user searches over a period of time.

In one embodiment of the method, the user is provided with auto-complete alternatives as the user enters query defining characters. The method detects entry of a completed query defining word by the user and provides the user with query results and query refinement options related to the query defining word. The method then determines whether the user selected a provided query refinement option and provides the user with updated query results when it is determined that the user has selected a provided query refinement option.

In one embodiment, the method of incrementally refining queries and updating query results is performed by executing instructions stored on a computer readable medium.

A user interface in a computer system including a display, a user input facility, and an application for presenting a user interface on the display that updates query results without requiring a user to provide an explicit indicator of query submission includes a query entry text box, a query refinement option list, and a query result list. The query entry text box allows a user to enter query defining characters. The query refinement option list and query result list are incrementally updated as a query is entered into the query entry text box.

A system for incrementally refining queries and updating query results without requiring a user to provide an explicit indicator of query submission includes a user input device enabling input of query defining text characters, a data content that is searchable, a memory in which machine instructions are stored, and a processor that performs the method of incrementally refining queries and updating query results. In one embodiment, the searchable database resides on one or more remote computers and data used to define query related character patterns resides on a user terminal. In one embodiment, the searchable data content includes data stored on a user hard drive, data stored on an intranet server, and data stored on an internet server.

These and other objects and advantages of the system constructed in accordance with an exemplary embodiment of the invention is more completely described in conjunction with the accompanying drawings.

DETAILED DESCRIPTION

Exemplary Operating Environment

Figure 1:
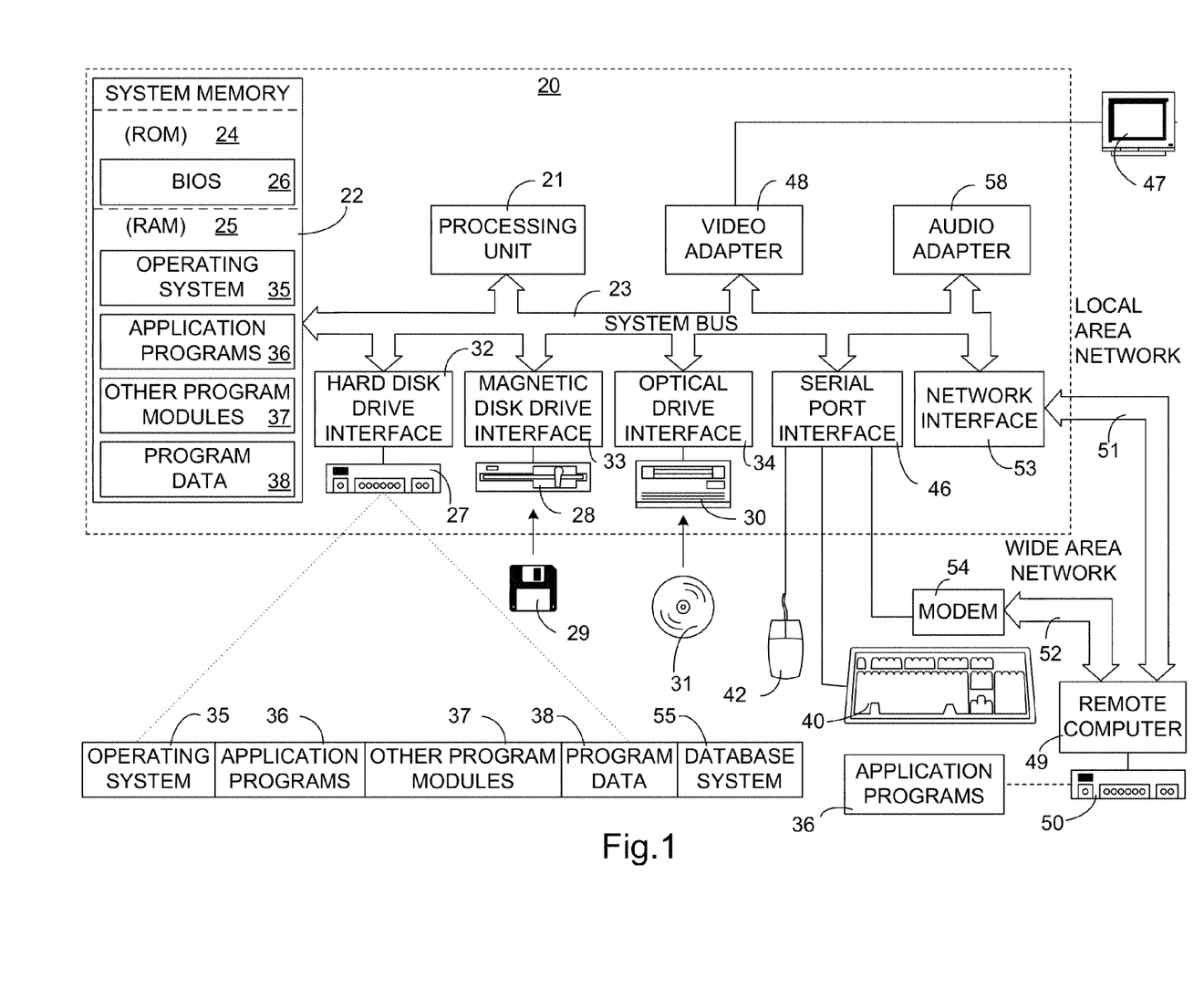
FIG. 1 is a schematic depiction of a computer system used in practicing an exemplary embodiment of the disclosed method.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk 27, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk 27, magnetic disk 29, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. The term "computer-readable media" as used herein refers to system memory 22 or the like, drives 27, 28, and 29 or the like and any corresponding media 29 and 31 or the like, and any other computer-readable media and computer storage media that is a statutory article of manufacture. In particular, a computer-readable medium as used herein is not a signal or carrier wave per se.

A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a widearea network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Method of Incrementally Refining Queries And Updating Results

Implementation of incremental or real time query refinement and result updating without requiring a user to provide an explicit indicator of query submission in client-side applications, e.g. a search toolbar 100 (FIGS. 5-7) increases the relevance of results 102 to the end user. The disclosed method of incremental updating results 102 and refining queries 104 guides the user toward a query that is specific and correctly constructed for optimal results retrieval from the web search engine. Better query input by the user results in better ranked results. This is especially true when the present method is used to suggest the query refinement or expansion, since the suggestion is based on knowledge that the search system has good results for the suggested query re-formulation.

Figure 2:
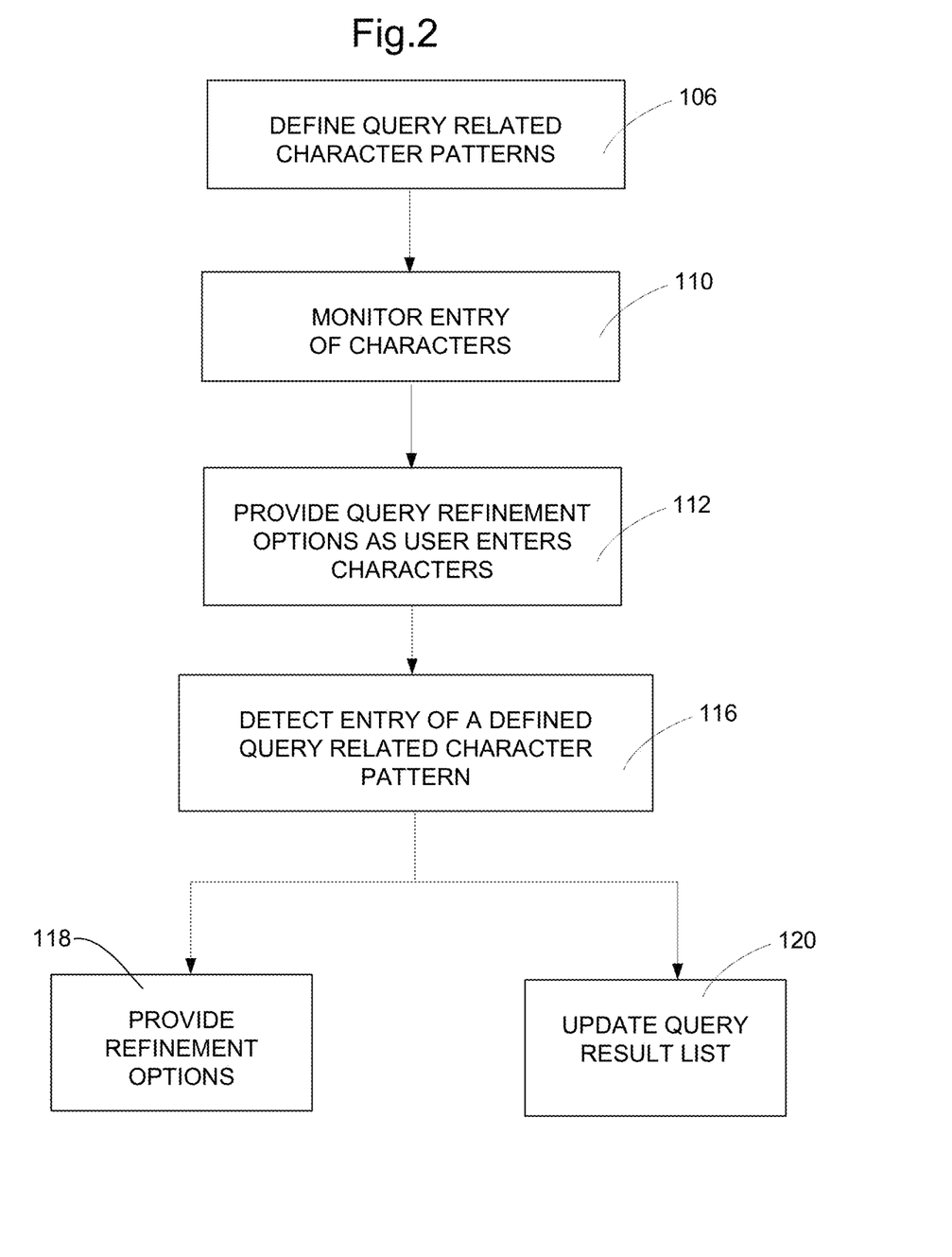
FIG. 2 is a flow chart that illustrates a method of incrementally refining queries and updating query result lists.

The flow chart of FIG. 2 outlines the method of incrementally refining queries and updating query results 102 without requiring a user to provide an explicit indicator of query submission, such as hitting an enter key or selecting a SEARCH or GO button on the search toolbar. Referring to FIG. 2, one or more query related character patterns 105 (FIGS. 5 and 6) that do not include an explicit indicator of query submission are defined 106. Examples of query related characters are patterns that indicate that a word or a root of a word has been entered, such as a series of characters followed by a space, a string of characters followed by a predefined time delay before additional characters are entered, a fixed number of characters, predefined words, etc. Entry of query defining characters 108 (FIG. 5) into a query entry text box 144 by a user is monitored 110. In the illustrated embodiment, user selectable query refinement options 111 (FIGS. 5 and 6) are provided 112 to the user as the user enters characters 108 in the text box. Each time entry of a defined query related character pattern is detected 116, the user is provided 118 with one or more suggested query refinement options 111 and an updated query result list 102 is provided 120. That is, as the user types the list of results 102 refines and query refinement suggestions 111 are presented to the user in real time in the exemplary embodiment. In the illustrated embodiment, the user is provided 112 with query refinement options as the user types even before a defined query related character pattern is detected. In one embodiment, query refinement options are not provided to the user until a defined query related character pattern is detected.

In one embodiment, the query related character patterns 105 are character patterns that indicate a word 122 has been input by the user. One such query related character pattern is a string of characters followed by a space. In the example illustrated by FIG. 5, the word "baseball" followed by a space indicates that a word 122 has been entered.

Figure 5:
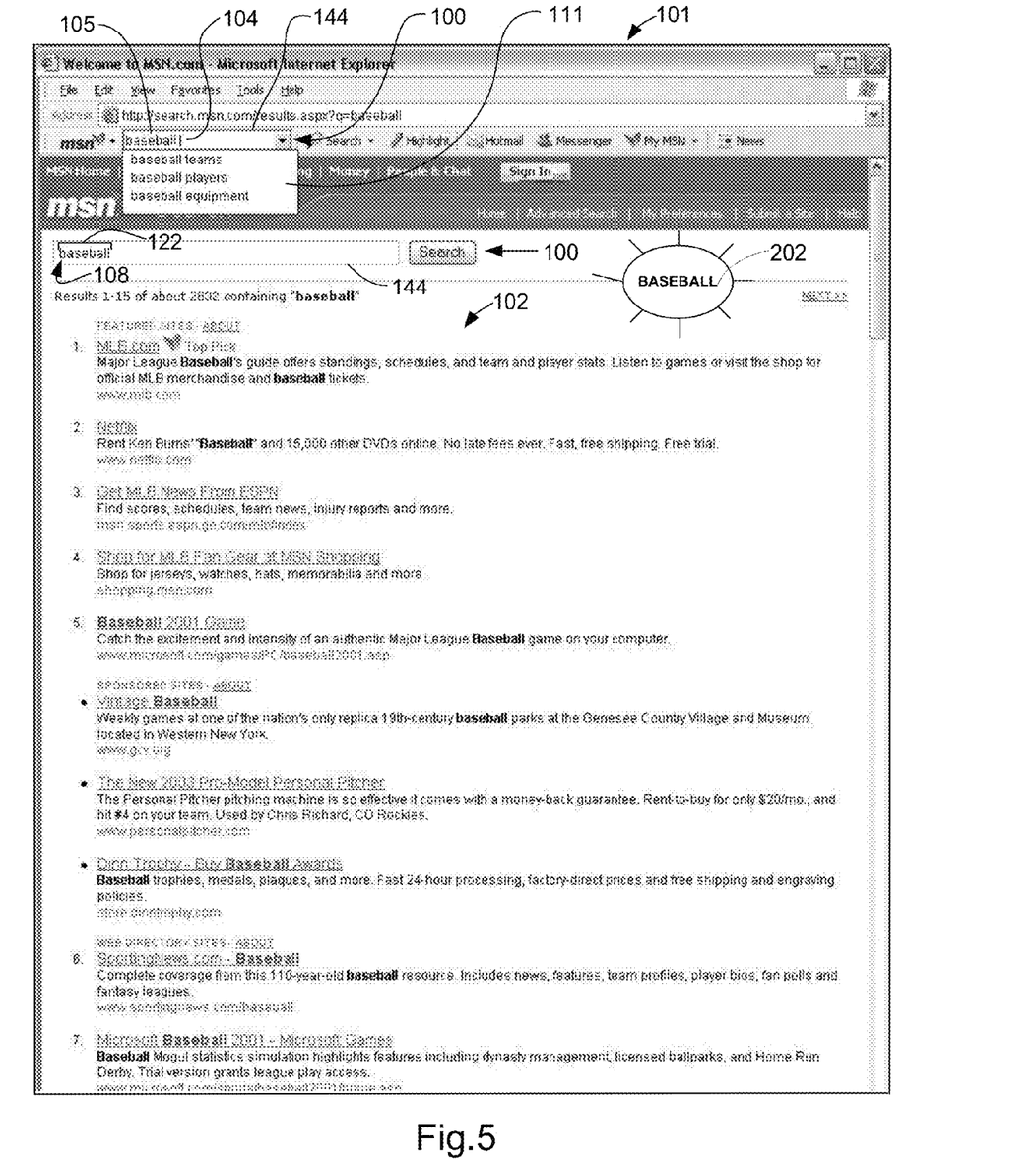
FIG. 5 is an illustration of a web page that employs a method of incrementally refining queries and updating query result lists.

As characters are entered by the user and/or when a query related character pattern 105 is detected, the user is provided with one or more query refinement options 111. Query refinement options 111 that may be provided include word or phrase auto-complete options and spelling correction options. In the example illustrated by FIG. 5, phrase auto-complete options "baseball teams," "baseball players," and "baseball equipment" options are provided when the method detects that the word "baseball" has been entered by the user. When entry of a query defining word 122 by the user is detected the user is also provided with an updated query result list 102. In the example of FIG. 5, the result list 102 is returned to the user when the method determines that the word "baseball" was entered by the user. In the exemplary embodiment, updated query refinement options and updated search results are also provided whenever letters and/or a word is deleted from the query box.

Figure 3:
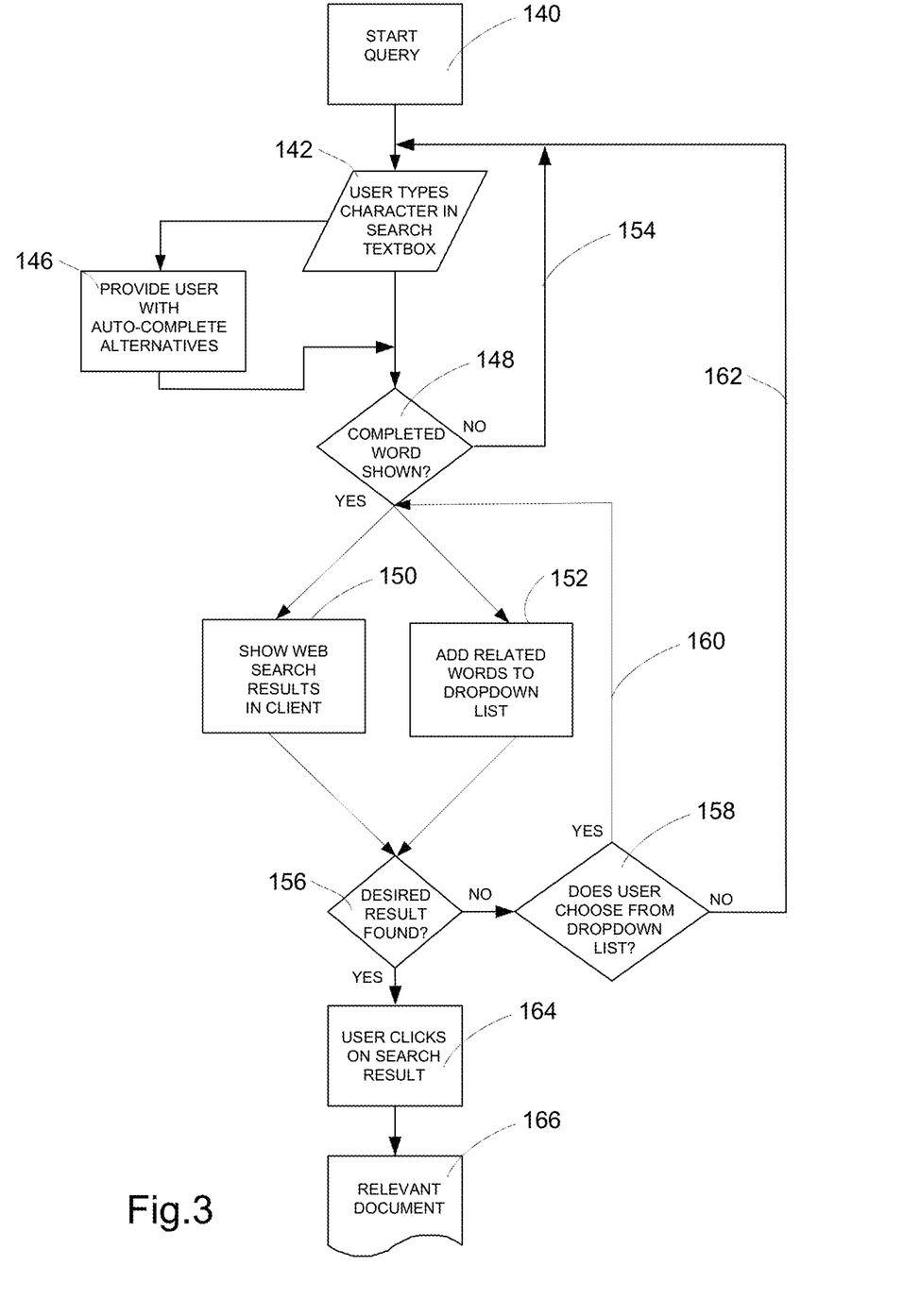
FIG. 3 is a flow chart that illustrates a method of incrementally refining queries and updating query result lists.

The flow chart of FIG. 3 illustrates one embodiment of the method where the query related character patterns 105 are defined to indicate a word 122 has been entered. In this embodiment, the user starts 140 a query and begins typing 142 characters in a search textbox 144 (FIG. 5). As the user types characters in the search textbox 144, the user is provided 146 with auto-complete alternatives as the user enters query defining characters. The method detects 148 entry of a completed query defining word by the user. If a query defining word is detected, the user is provided 150 with a query result list 102 for the completed word and is provided 152 with query refinement options related to the completed word, such as the detected word plus added related words. The monitoring for a completed query defining word and providing of query refinement options as the user types is repeated 154 until a query defining word is detected. The method monitors the input of the user to determine 156 whether the desired result is found in the current query result list 102. If the desired result is not found in the query result list, the method then determines 158 whether the user selected a provided query refinement option. When it is determined that the user has selected a provided query refinement option, the user is provided 160 with an updated query result list and new query refinement options that correspond to the selected query refinement option. When it is determined that the user has not selected a provided query refinement option, the method repeats 162 to provide "real time" updates to the result list and the query refinement options in the exemplary embodiment. Once the desired result is found, the user will select 164 the desired search result, and a relevant document will be returned 166.

The query refinement options typically fall into one of the following categories:

1) The submitted query term appears to be too broad. The query refinement options are suggestions for narrowing the query. For example, a second term is suggested after a first term is entered;

2) The submitted query term appears to be too narrow. The query refinement options are suggestions for broadening the query. For example, a category may be suggested when narrow search terms are entered.

3) The submitted query term suggests that the user might have meant something else. For example, spelling suggestions and synonyms are query refinement options that replace the originally entered term with a new, more appropriate term;

4) Auto-completion of a query. As a query is typed in, suggested terms for completing the term/query are presented; and 5) The submitted query has an equivalent. The system knows that good search results are available for exact, approximate, or rough equivalent of the submitted terms. For example, if the user enters football scoreboard and the system knows that it has very good results for football scores, the system suggests football scores as a query refinement.

Figure 8A:
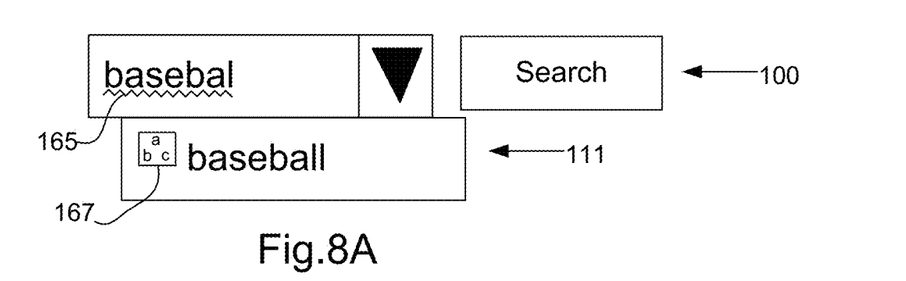
FIG. 8A is an illustration of a toolbar that provides query refinement options.
Figure 8B:
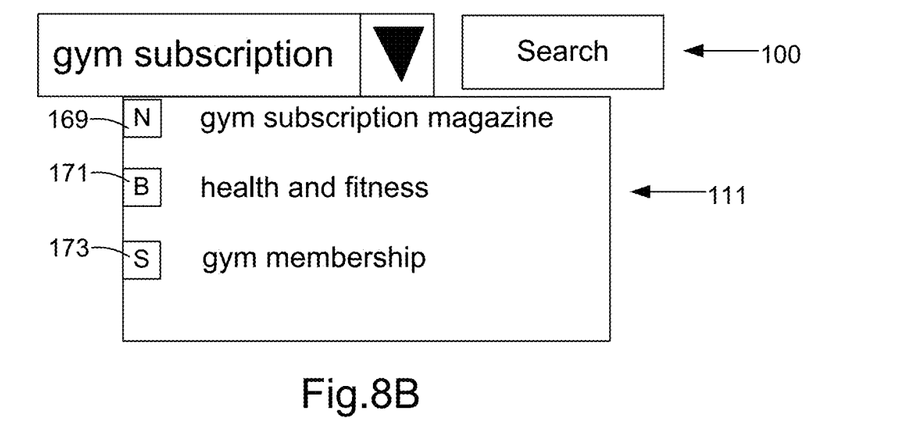
FIG. 8B is an illustration of a toolbar that provides query refinement options.

Referring to FIGS. 8A and 8B, the query refinement options include spell-correction of words, auto-completion of words, suggestion of synonyms, and broadening categorical suggestions. In the embodiment illustrated by FIG. 8A a misspelled word is identified to a user by underlining the word with a "squiggly" line 165 (Example: basebal). A spell correct 167 icon may also be provided to indicate that the query refinement option is a spelling correction. Referring to FIG. 8B, icons are provided that indicate the type of query refinement option. In the example shown by FIG. 8B, a narrowing icon 169 is provided for a query refinement option that narrows the query, a broadening icon 171 is provided for a query refinement option that broadens the query, and synonym icon 173 is provided that indicates that one or more of the query terms is replaces by a synonym in the query refinement option. It should be readily apparent that a wide variety of different query refinement options could be provided and are not limited to the types of refinement options specifically shown or described.

The refinement options that are provided to the user are based on a variety of stored information. For example, query logs, web graphs, web documents, local trigger pairs, dictionaries, thesauruses, proper name lists, categorical and taxonomy information, and word-breaking or stemming criteria are used to determine what will be presented to the user as the suggested query refinement. This information can be stored locally on the client terminal and/or on the server.

The combination of spell correction of words, auto-completion of words and the intermediate returning of results per typed word provides a progressive query refinement model that increases the accuracy and context of the search terms, resulting in a higher quality of search results. These features allow for progressive queries in real time with the user typing.

Figure 4:
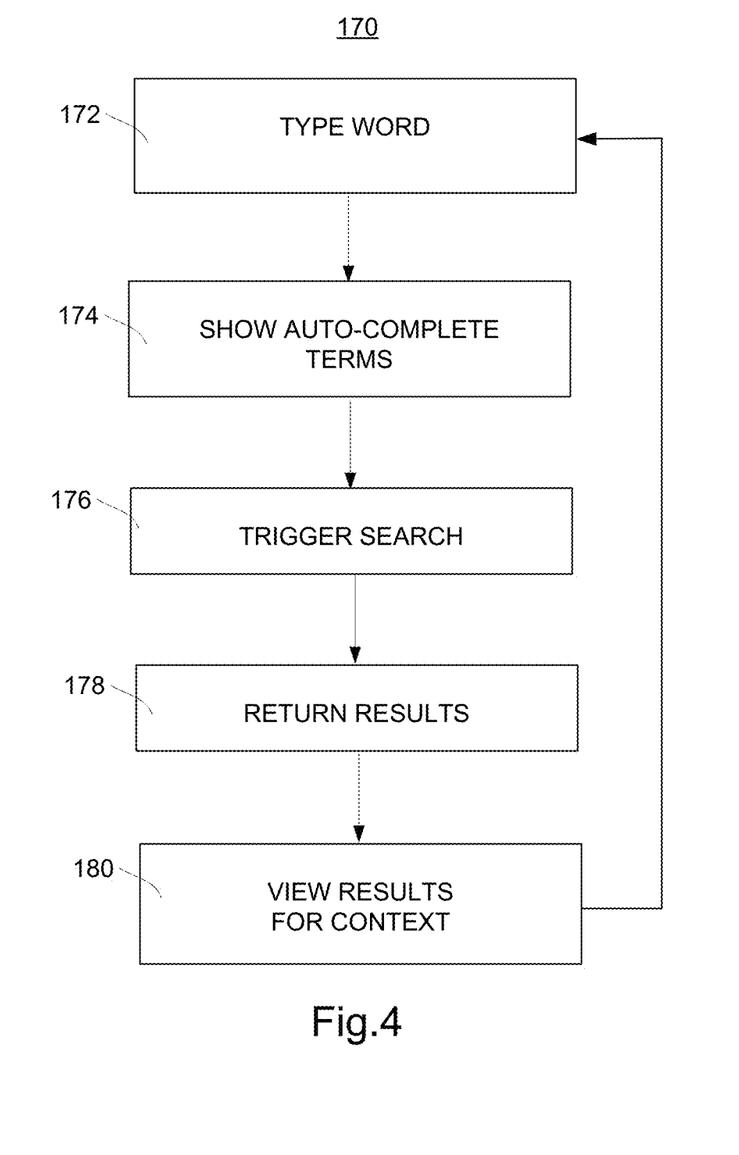
FIG. 4 is an illustration of a user search technique model.

When the method illustrated by FIG. 3 is implemented in a client-side application, such as a search toolbar, the user can employ the search technique 170 illustrated by FIG. 4. The illustrated toolbar is just one example of an entry point where the disclosed method can be implemented. The disclosed method can be used anywhere users enter queries. The entry point could be any rich client or traditional HTML-based web search interface. The disclosed method is especially useful in mobile device applications where display areas are small and in interfaces where accessibility is limited, i.e., the user cannot easily type. The user types 172 a word. Query refinement options, such as auto-complete terms are shown 174 to the user. The user input triggers 176 execution of the search. One or more of a variety of input triggers may initiate the search. For example, the trigger may be an indicator of query search term separation or an indicator that there is an opportunity to show query refinement suggestions and/or search results. Examples of these indicators include a space bar entry, typing timing, time-outs, entry of words found in a dictionary, and word breakers. Results are returned 178 when the user input triggers the search. The user views 180 the results. This cycle is repeated each time the user enters text in a way that automatically triggers a search to provide real time query results and query refinement options as the user types, rather than after the entire query is entered. This cycle of "type word, show auto-complete terms, hit spacebar, return results, view results for context, type another word" continues until the user sees a relevant result and clicks through. The disclosed searching method provides query refinement suggestions that are based not only on strings and substrings that match known entities. In the exemplary embodiment, the disclosed method applies relevance algorithms of the search system to correlate the typed query strings to the available results by suggesting query adjustment and/or completion suggestions that are easy for the user to select.

Figure 6:
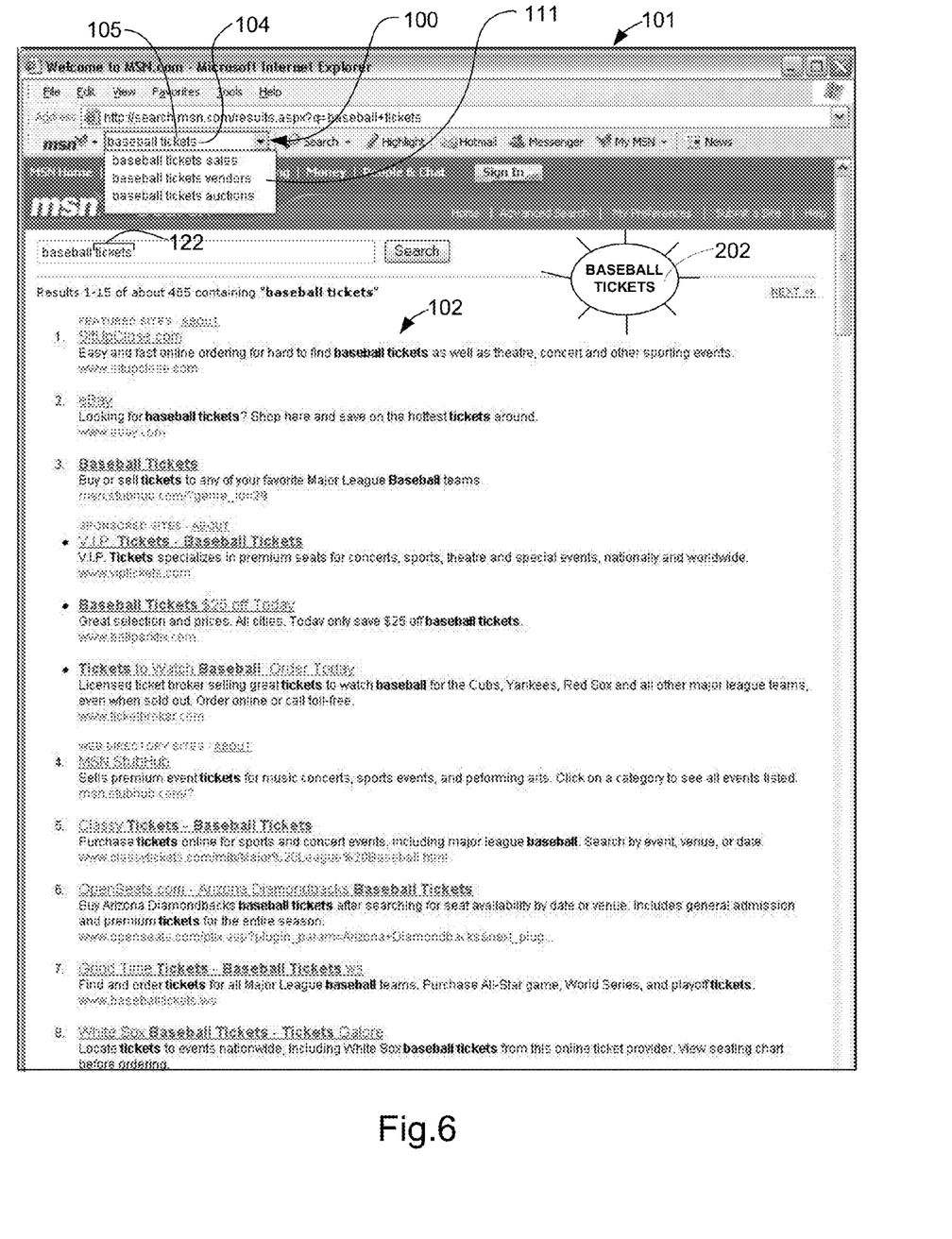
FIG. 6 is an illustration of a web page that employs a method of incrementally refining queries and updating query result lists.
Figure 7:
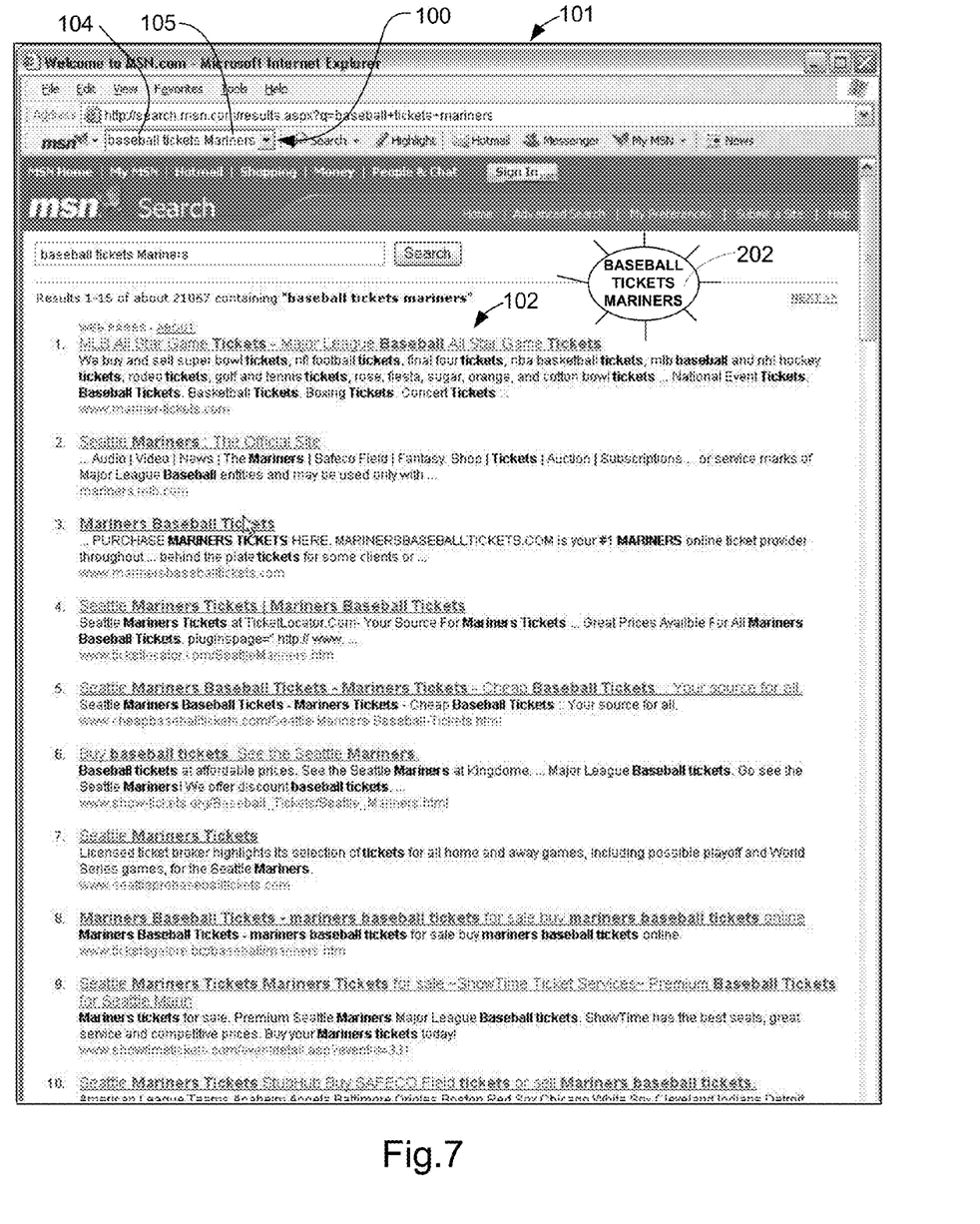
FIG. 7 is an illustration of a web page that employs a method of incrementally refining queries and updating query result lists.

FIGS. 5-7 illustrate one user interface 101 that can be used to provide search results and query refinement suggestions as users type. The user interface 101 includes a query entry text box 144, a query refinement option list 111, and a query result list 102. The illustrated example of one user interface that can be implemented is in the form of a web page. The web page screens illustrated by FIGS. 5-7 show the flow of events for someone searching for Mariner's baseball tickets. The example illustrated by the web pages of FIGS. 5-7 show how queries and result lists are incrementally refined for a user. Referring to FIG. 5, a user enters text characters 108 into a search box 144. As the user types, the auto-complete interface suggests words starting with the characters the user has already typed. These suggested words will display in a drop-down list under the search terms. As the user hits the spacebar, the client-side application will send the typed terms to the search engine, with the engine returning results to display to the user, providing search engine results for the terms identified. At the same time, the client side application will also display suggested refinement terms based on words related to the search terms already typed. These related words can be pulled from past queries or from trigger pair models derived from crawling and indexing the web corpus.

In FIG. 5, the user types "baseball" and a space and is presented with a dropdown list showing suggested terms related to baseball. In the embodiment illustrated by FIG. 5, one of the defined query related character patterns is a text string followed by a space, indicating that a word has been entered. When the text string "baseball" followed by a space is entered, entry of a word is detected. When entry of the word "baseball" is detected, the query refinement options "baseball teams," "baseball players," and "baseball equipment" are provided. In this example, the query refinement options are the word entered by the user plus a related word. In the example of FIG. 5, when entry of the word "baseball" is detected, the result list 102 that corresponds to the search term "baseball" is also provided.

Referring to FIG. 6, the user types "tickets" and a space and is presented with a new list of suggested search terms and an updated result list. When the text string "tickets" followed by a space is entered, entry of a second word is detected. When entry of the second word "tickets" is detected, the query refinement options "baseball tickets sales," "baseball tickets vendors," and "baseball tickets auctions" are provided. In the example of FIG. 6, when entry of the word "tickets" is detected, the result list 102 that corresponds to the search terms "baseball tickets" is also provided.

Referring to FIG. 7, the user types "Mariners" which causes in the results the user was seeking being returned in the example. The continuous updating of the result list as the query is typed in provides the user with context that helps to produce user-specific relevant results. The incrementally updated results allow the user to provide better input, because the user has an idea if his query terms are leading him in the right direction before he enters the entire query. This improved input by the user results in better ranked search results. The additional context given in addition to the entered query terms result in a higher chance that the returned results are relevant to the user. Relevance of results is the key driver in web search engine market share.

Figure 9:
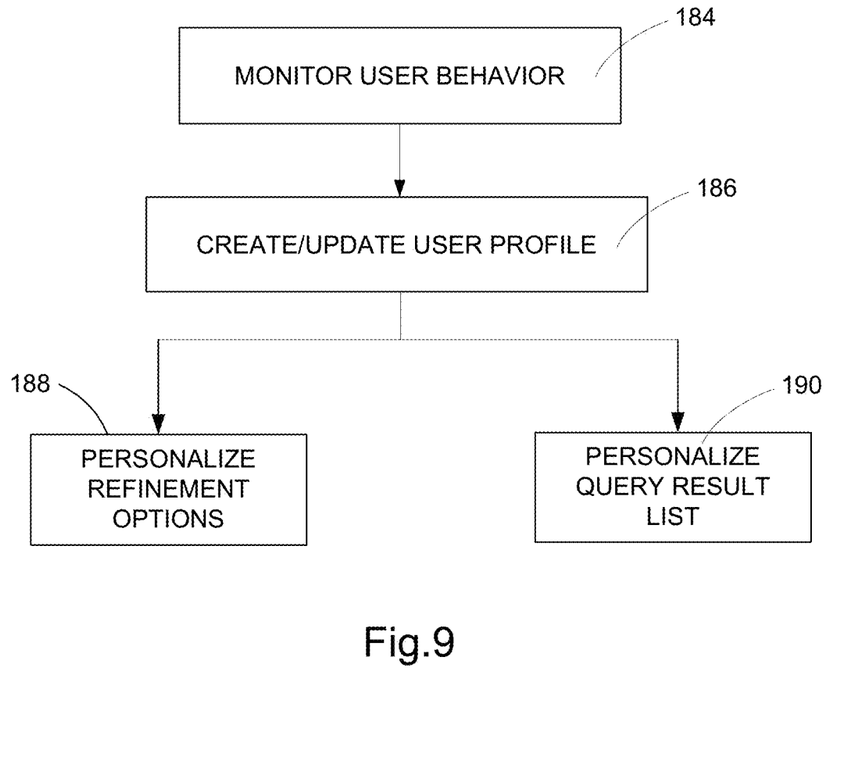
FIG. 9 is a flow chart that illustrates personalization of refinement options and query result lists.

Referring to FIG. 9, the query refinement options and/or the result updating are personalized for each user in the exemplary embodiment. This personalization is accomplished by monitoring 184 the user's behavior. This monitoring may include tracking queries entered by the user and/or the results selected by the user. The information collected by monitoring the user is used to create or update 186 a user profile. Information that may be contained in the user profile includes query logs, user's age, sex, zip code, and past web selections. The suggested query refinement options are personalized 188 and the order of the query result list is personalized 190 based on the user profile. For example, a result that the user has clicked on in the past or is related to the user's profile may be moved to the top of the results list. In the exemplary embodiment, this personalization is learned over a period of time. The user profile that stores this personalization may be stored in the client computer or in a user profile database that is accessible to the server. As the personalization is learned for a given user, the suggested query refinement options and result list ordering evolves to correlate with the user.

In one embodiment, a visual indicator 202 is provided to the user when an updated query result list is provided that makes the user aware of the update to the result list. This indicator lets the user know that the result list has been updated. The visual indicator 202 may be a change in the color or font of the result list could change or the visual indicator could be an icon that appears to indicate that the result list has been updated. This visual indicator could also be an animation of the result list for a period of time or a transition of one result set to the next result set. For example, the result list could appear to gradually "roll over" from one result set to the next in a fashion similar to schedules at a train station.

In one embodiment, the query refinement option list 111 is semi-transparent. This allows the portion of the user interface "behind" the refinement option list to be viewed by the user even when the query refinement option list 111 is present. This is an especially useful feature in applications, such as hand-held computers, where the display area is small.

In one embodiment, the toolbar 100 searches local resources at the same time a web search is performed. In this embodiment, the client-side toolbar application searches a user's hard drive, an intranet server, and/or an internet server. Resources, such as the user's mail, documents, photos, etc. can be included in searches. In this embodiment, the provided updated query result list includes result listings from the user hard drive, the intranet server, and the internet server.

In one embodiment, the defining of the query related character patterns is controlled to control the frequency at which the result list and the query refinement options are updated. The query related character patterns may be based on a characteristic of the client-server connection, such as connection speed. The query related character patterns may be defined to occur more frequently with higher connection speeds. For example, when high connection speeds are present, the query related character pattern may be the entry of a short number of characters or even entry of a single character, causing the result list and the query refinement options to be updated very frequently. When connection speeds are slow, the query related character pattern may be entry of two or more words, causing the result list and the query refinement options to be updated less frequently. In the exemplary embodiment, several additional criteria are also considered in determining how often the result list and the query refinement options are updated.

The query related character patterns and the frequency at which the result list and the query refinement options are updated can be adapted to a particular user bases on the user's search context or preferences. For example, some users may prefer updated search suggestions and result list updates very often, while other users might be confused by frequent search refinements and result updates. In one embodiment, adaptive learning is used to adjust the frequency at which result lists and/or query refinement options are updated until the system is optimized for a particular user.

Other criteria considered in determining how often the result list and the query refinement options are updated are load on the search server, stop words, and the location of the data being searched. When the load on the search server is high the result list and the query refinement options may be updated less frequently. Defined "stop" words prevent a call to the server to update the result list and the query refinement options, since the stop words do not add anything substantive to the query. Examples of stop words are "the," "a," and "of." Whether the data being searched is local/corpnet data is a factor in determining how often to update the result list and the query refinement options. For example, the result list and the query refinement options may be updated more often when the search is local. In one embodiment, a user input is provided that allows the user to adjust the query related character patterns and/or the frequency at which the result list and the query refinement options are updated. This user input may be in the form of a slider shown in the application. The input allows the user to reduce the frequency at which the result list and the query refinement options are updated if the user finds that these features are slowing the application down too much. The input allows the user to increase the frequency at which the result list and the query refinement options are updated if the user finds these features to be particularly helpful.

In the exemplary embodiment, the method of incrementally refining queries and updating query result is stored as executable instructions on a computer readable medium that is run in the operating environment illustrated by FIG. 1. In one embodiment, disclosed method is implemented in a client-server arrangement. In this embodiment, the method is integrated in the browser or search toolbar that runs on the client computer. In another embodiment, the method is practiced in a server only environment.

While the present invention has been described with a degree of particularity, it is the intent that the invention includes all modifications and alterations falling within the spirit or scope of the appended claims.

The invention claimed is:

1. A method performed on a computing device, the method comprising substantially simultaneously providing, in response to receiving one or more characters that form at least a portion of a query string without an explicit submission of the portion of the query string, both a query result list and a query refinement options list, where the received one or more characters match a pattern that is defined based on a characteristic of a connection.

2. The method of claim 1 where the query result list is configured to include results from a local source, an intranet source, or an Internet source.

3. The method of claim 1 further comprising controlling a frequency at which the providing both the query result list and the query refinement options list is performed, wherein the frequency is determined based at least in part on the characters.

4. The method of claim 3 wherein the frequency is further determined based at least in part on a connection speed.

5. The method of claim 3 wherein the frequency is further determined based at least in part on adaptations unique to each of a plurality of users.

6. The method of claim 3 wherein the frequency is further determined based at least in part on a word that does not substantively add to the query string.

7. The method of claim 1 where the substantially simultaneously providing is in real-time as a user enters the received one or more characters.

8. At least one computer-readable medium storing computer-executable instructions that, when executed by a computing device, cause the computing device to perform a method comprising substantially simultaneously providing, in response to receiving one or more characters that form at least a portion of a query string being provided without an explicit submission of the portion of the query string, both a query result list and a query refinement options list, where the received one or more characters match a pattern that is defined based on a characteristic of a connection.

9. The at least one computer-readable medium of claim 8 where the query result list is configured to include results from a local source, an intranet source, or an Internet source.

10. The at least one computer-readable medium of claim 8 wherein the method further comprises controlling a frequency at which the providing both the query result list and the query refinement options list is performed, wherein the frequency is determined based at least in part on the characters.

11. The at least one computer-readable medium of claim 10 wherein the frequency is further determined based at least in part on a connection speed.

12. The at least one computer-readable medium of claim 10 wherein the frequency is further determined based at least in part on adaptations unique to each of a plurality of users.

13. The at least one computer-readable medium of claim 10 wherein the frequency is further determined based at least in part on a word that does not substantively add to the query string.

14. The at least one computer-readable medium of claim 8 where the substantially simultaneously providing is in real-time as a user enters the received one or more characters.

15. A system comprising a computing device and at least one program module together configured for substantially simultaneously providing, in response to receiving one or more characters that form at least a portion of a query string being provided without an explicit submission of the portion of the query string, both a query result list and a query refinement options list, where the received one or more characters match a pattern that is defined based on a characteristic of a connection.

16. The system of claim 15 where the query result list is configured to include results from a local source, an intranet source, or an Internet source.

17. The system of claim 15 further comprising the computer further configured for controlling a frequency at which the providing both the query result list and the query refinement options list is performed, where the frequency is determined based at least in part on the characters.

18. The system of claim 17 where the frequency is further determined based at least in part on adaptations unique to each of a plurality of users.

19. The system of claim 17 where the frequency is further determined based at least in part on a word that does not substantively add to the query string.

20. The system of claim 15 where the substantially simultaneously providing is in real-time as a user enters the received one or more characters.

* * * * *